Inventors
GROVER C. HOCH,
FRANK CAMPBELL,
FRANK MEYERS,
By Bailey & Parson
Attorneys Aug. 25, 1942.      G. C. HOCH ET AL      2,294,032
RAILROAD CAR HEATER
Filed Nov. 8, 1940      4 Sheets-Sheet 3

Fig. 3.

Inventors
GROVER C. HOCH,
FRANK CAMPBELL,
FRANK MEYERS,

By Bailey J. Parson
Attorneys

Aug. 25, 1942.   G. C. HOCH ET AL   2,294,032
RAILROAD CAR HEATER
Filed Nov. 8, 1940   4 Sheets-Sheet 4

Inventors
GROVER C. HOCH,
FRANK CAMPBELL,
FRANK MEYERS,

By Bailey & Parson
Attorneys

Patented Aug. 25, 1942

2,294,032

UNITED STATES PATENT OFFICE 2,294,032

RAILROAD CAR HEATER

Grover C. Hoch, Frank Campbell, and Frank Meyers, Dubuque, Iowa, assignors to William H. Klauer, Dubuque, Iowa Application November 8, 1940, Serial No. 364,918

3 Claims. (Cl. 236—95)

This invention relates to heaters and more particularly to the type of heaters which are used in railroad freight cars during the cold season to prevent the freezing of perishable goods. Specifically, the invention relates to charcoal heaters.

Charcoal heaters of the general type shown in the drawings herein have been used quite extensively for this purpose for a number of years. Such a heater is shown for example in the Baxter patent, Reissue No. 14,648. While satisfactory to a certain extent, and while they have saved the railroads thousands of dollars in claims from the freezing or spoiling of fruits and vegetables, they have been subject to the disadvantage that they cannot be accurately controlled. While, for example, they have prevented the freezing of fruits, they sometimes have spoiled those same fruits by heating the cars to temperatures deleterious to the fruits. Furthermore, various fruits and vegetables fare better at different temperatures, and charcoal freight car heaters heretofore known have been incapable of accurate temperature adjustment.

It is most important in the transportation of fruits and vegetables that a close and accurate temperature regulation be maintained. The permissible range for various fruits and vegetables is sometimes very narrow. It is difficult to control a charcoal burner so as to control temperature within a comparatively limited range. Still it is quite essential that the burner be accurately controlled to obtain the best results.

The principal object of the present invention is the provision of a charcoal heater for railroad freight cars and the like, which heater is capable of relatively accurate temperature control within limits suitable for various grades and kinds of perishable fruits and vegetables.

Another object of the invention is the provision of such a charcoal heater which is sturdy in construction, and the temperature control parts of which are not easily affected by jars, jolts and the like, as are experienced in freight car travel. Moreover, the invention makes possible an adjustment within narrow ranges but capable of a wide variation. The invention provides an adjustment which is simple to make and accurate in effect.

Other objects and advantages will be more apparent from the following description and claims when read in conjunction with the accompanying drawings in which:

Fig. 3 is a view on the line 3—3 of Fig. 2.

Fig. 5 is a detail view of the hopper control valve arrangement.

Figure 1:
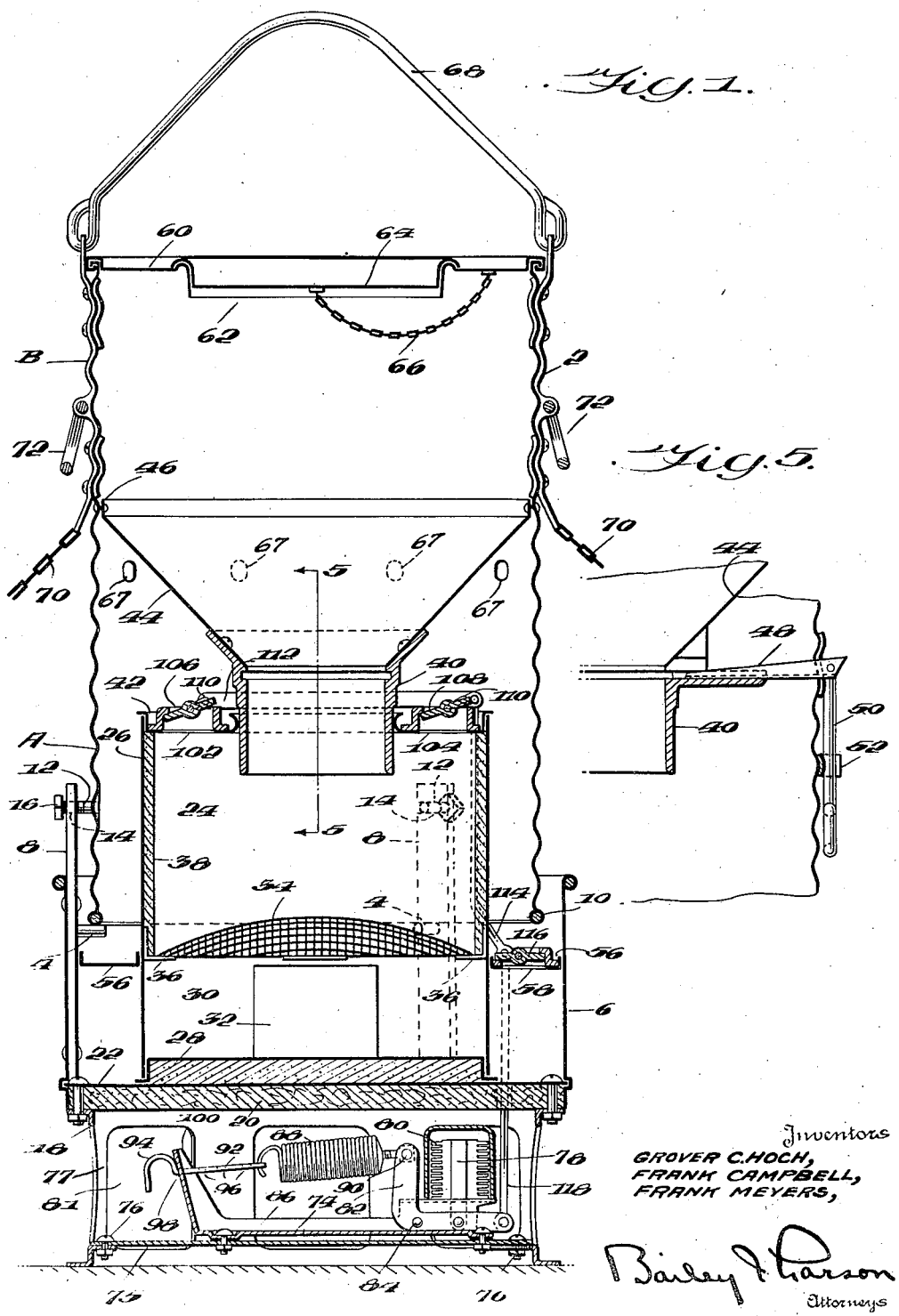
Fig. 1 is a side elevation of the invention partly in cross section.

The heater illustrated is constructed substantially all of sheet metal and generally is cylindrical in form. It is made up of two main sections, a lower fire pot section A and an upper magazine section B. The magazine section B is housed in a top shell 2 and in assembled position is supported upon the lower fire pot section A by means of rest pins 4 which extend inwardly from the outer shell 6 of the lower fire pot section A, as can perhaps best be seen in Fig. 2. The rest pins 4 are secured to support rods 8 and said pins support the lower reinforced edge 10 of the top shell 2. Additional securing means for the heater section is provided by the threaded pins 12 extending outwardly from the top shell 2 which are adapted to be engaged in notches 14 in the support rods 8 by means of nuts 16 or the like.

Figure 2:
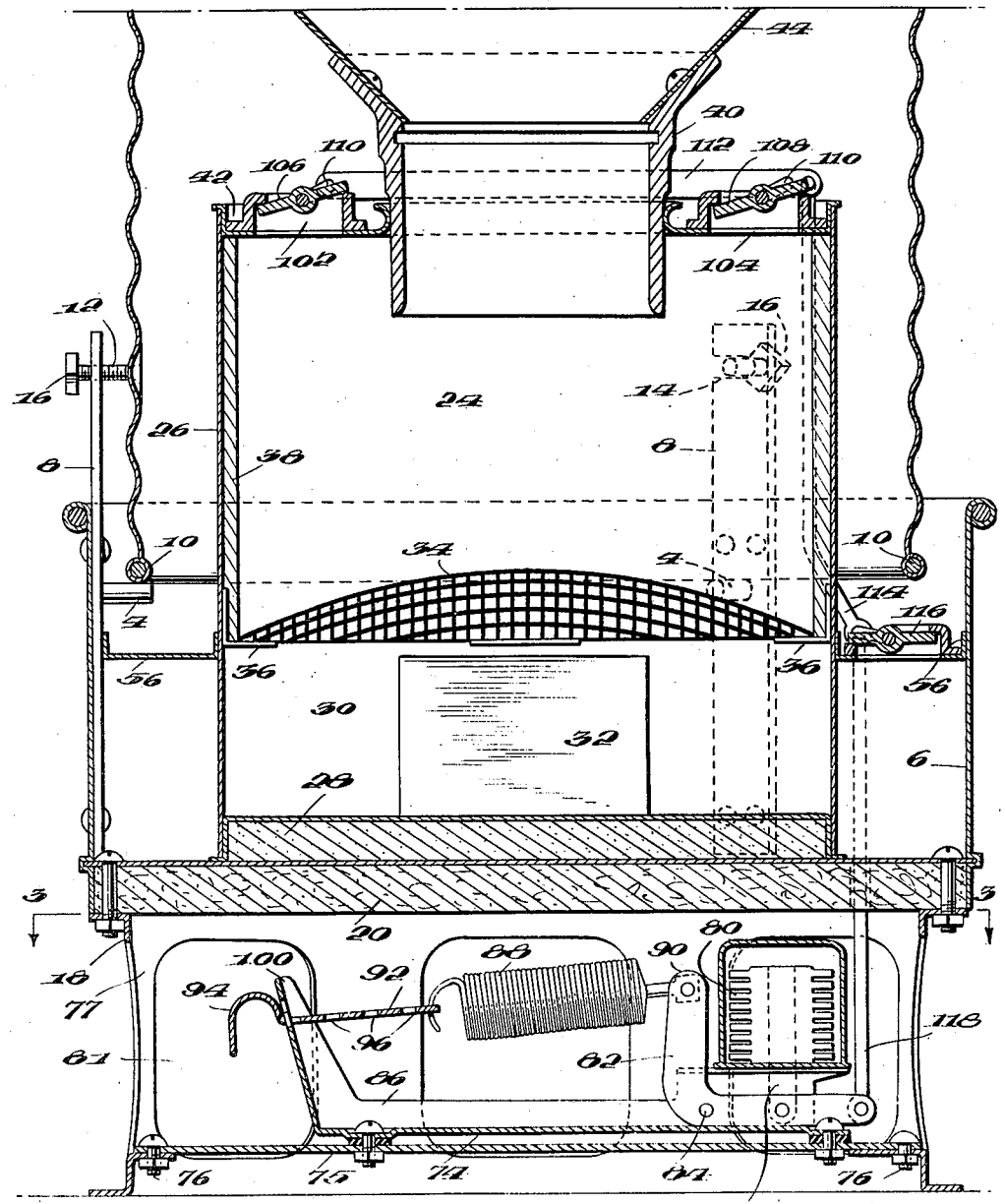
Fig. 2 is an enlargement of the lower part of Fig. 1.
Figure 4:
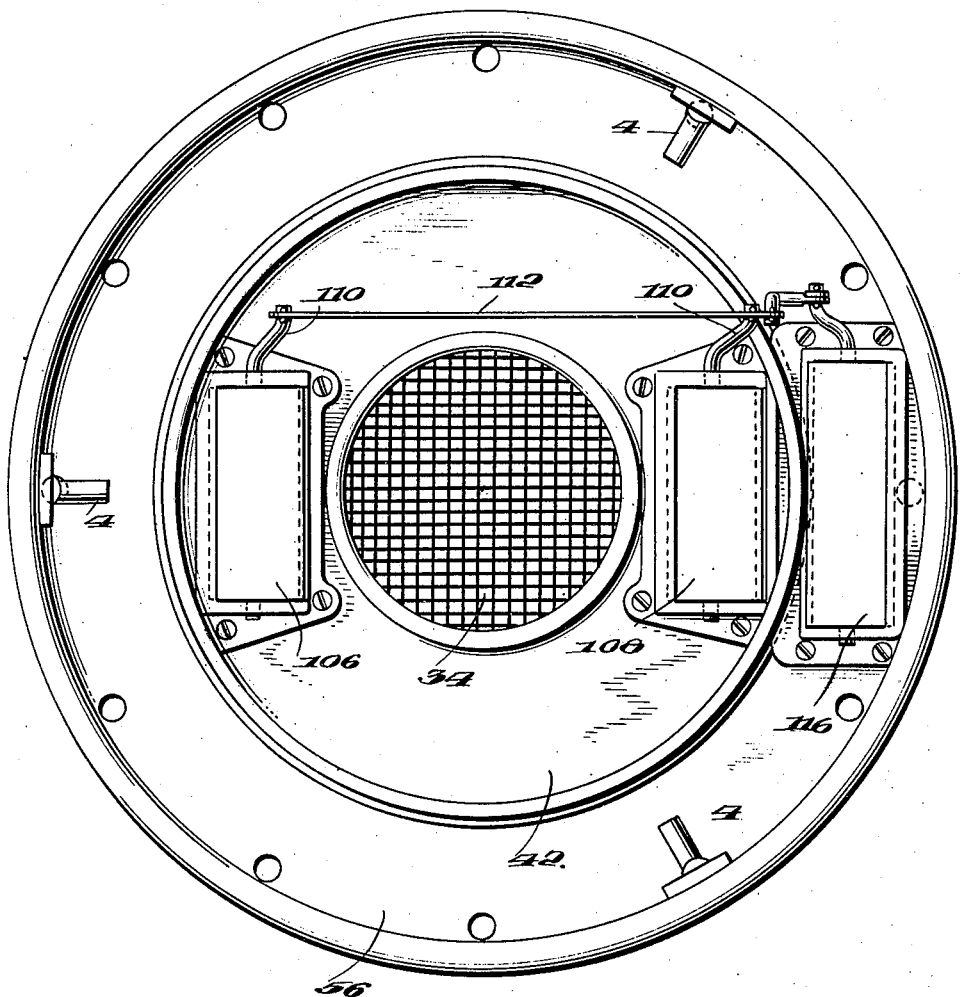
Fig. 4 is a plan view of the heater with the top cover and hopper removed.

With reference to Fig. 2, the lower fire pot section A is comprised of a base section generally indicated by the reference numeral 18. The base section, as will be described in greater detail later, houses a thermostat capable of being set for various temperatures. Above the thermostat is a solid piece of insulation material 20, such as ¾" "Marinite." The "Marinite" is covered by a sheet of metal 22 upon which rests the fire pot or combustion chamber 24, which will now be described.

The fire pot or combustion chamber 24 is comprised of an upright cylindrical sheet metal wall 26 disposed concentrically about the vertical axis of the heater. In the base of the combustion chamber 24 is disposed a covered section of mica insulation 28 or the like. Above this insulation is an ash pit 30, which may house a drawer 32 in part of which may be a "starter" capable of being saturated with kerosene or the like for starting the heater in operation. Above the ash pit 30 is the grate 34, which is removable, and which is supported by the grate rests 36 secured to the cylindrical sheet metal wall 26 forming the main wall of the fire pot or combustion chamber 24. Also supported by the grate rests 36 is a cylindrical fire pot lining 38.

Fuel in the form of charcoal briquets or the like is supplied to the fire pot 24 from the top through a closable hopper 40 which is mainly of cast material and which is disposed in a central fuel opening in the top cover 42 of the combustion chamber 24. A sheet metal funnel section 44 of the hopper 40 is secured at its peripheral edges, as at 46 (Fig. 1), to the top outer shell 2.

The device is also provided with means for controlling the amount of fuel which may pass from the upper magazine section into the fire pot or combustion chamber 24. This is accomplished by providing the lower portion of the hopper 40 with a horizontally slidable control member 48 (see Fig. 5). This control member slides in a slot and when in its innermost position blocks the passage of fuel from the hopper down into the combustion chamber 24. The sliding movement of the control member is effected manually through the means of a hinged actuating handle 50 which when straightened out to a horizontal position may be moved horizontally inwards to shove the control member 48 to close off the fuel passage. The handle 50 is shown in the, or open, position in which it rests flat against the outer wall of the shell 2 where it is caught in rest position by the catch member 52.

The top cover 42 of the fire pot 24 also has closable heat exhaust damper openings therein, which will be described more fully hereinafter.

The fire pot section A has the cylindrical shell 6 spaced outwardly from, but concentric with, the fire pot wall 26. It is this outer shell 6 to which the support rods 8 are secured.

The annular space between the fire pot wall 26 and the outer shell 54 is partially closed off by an annular cover member 56 which has a closable draft damper opening 58 therein for purposes to be later described.

The extreme upper part of the upper shell 2 of the heater terminates in a cover 60 having a central opening 62 provided with a lid 64. A chain 66 is supplied to prevent the lid from becoming lost but still permitting its removal for the purpose of filling the hopper with charcoal.

Also provided in the shell 2 are heat outlet ports 67. These are located just beneath the line on which the funnel section 44 of the hopper is secured to the shell 2.

The assembled heater may be carried by means of the bail 68. When in use the heater is secured to the floor or wall of a produce car by means of the fastening chains 70.

Suitable handles 72 may also be provided to facilitate handling.

It will be noted that the entire construction is such as to permit ease of handling and also to permit the stacking of one heater upon another in storage.

From reference to Figs. 2 and 3, it will be noted that the thermostat heretofore mentioned is mounted in the base of the firepot section A. The thermostat unit is mounted on a base member 74 of sheet metal or the like which is secured to the bottom 75 of the thermostat housing by means of bolts 76, or the like. The bottom 75 (as shown in Fig. 3) and the sides 77 of the thermostat housing (as shown in Fig. 2) are provided with openings 79 and 81, respectively, to permit air from the railroad car to reach the thermostat proper which may be of the bellows or expansible type. An arm 78 secured to move with the bellows 80 as the latter expands or contracts is pivotally secured to a double armed lever 82 which in turn is pivotally mounted as at 84 to an upstanding portion 86 of the base member.

Adjustment of the thermostat, so as to render the heater available for the control of temperature for the shipment of various kinds of fruits and vegetables, is obtained by means of the spring 88 secured at one end to the end 90 of the double armed lever 82 and at the other to a pull member 92. The pull member is provided with a hooked end 94 to permit it to be grasped by an operator and adjusted to any one of a series of predetermined positions. The pull member 92 may be secured in any one of these positions by providing it with a corresponding series of openings 96, each of which is adapted to engage a tongue in an opening 98 in an upstanding portion 100 of the base member 74 through which opening the pull member 92 passes.

It will be understood that by adjusting the pull member to any one of the positions referred to, the tension of the spring can be correspondingly adjusted. Adjustment of the spring controls the action of the thermostat and sets the limits of action thereof. For example, the tension of the spring and the thermostat may be selected so that the notches on the pull member 92 reading from left to right in Fig. 2 will cause the thermostat to act at 36°, 42°, 48° and 54° F. respectively. In this manner the thermostat may be set to maintain the proper car temperature for various kinds of fruits and vegetables, many of which require different degrees of temperature during transportation.

Because of the openings in the thermostat housing and further because of the insulation referred to, the thermostat is only affected by the inside temperature of the railroad car, and not by the heat from the heater.

The specific purpose of the thermostat is to control a delicate arrangement of dampers in the heater proper.

From Fig. 2, it will be seen that the top 42 of the combustion chamber 24 is provided with heat exhaust openings 102, 104 which are adapted to be closed by pivoted dampers 106 and 108. These dampers each have a pin 110 projecting therefrom. The pins 110 are offset from the pivot points of the dampers and are connected by a bar 112 so that actuation of the bar 112 in a manner to be described will result in simultaneous movement of each damper member. The bar 112 extends slightly beyond the damper 108 and this extended part is provided with an opening which receives the hooked end of the damper connecting rod 114. The lower end of this rod is pivotally connected to a lower draft damper member 116 which is pivotally mounted in the draft opening 58 in the annular cover member 56 disposed between the fire pot wall 26 and the outer shell 54 of the fire pot section A. A second connecting rod 118 is pivoted at one end to the damper member 116, and at its lower end to the arm 120 of the double armed lever 82. This connecting rod 118 passes through suitable openings in the insulation 20, and covering sheet 22.

It should now be evident that if the temperature of the railroad car becomes lower than the temperature set for the thermostat, movement of the bellows in a corresponding amount will cause movement of the arm 78, and consequently tilt the double armed lever 82 about its pivot point 84. Such action will result in a raising of the connecting rods 118 and 114 and a corresponding opening of the dampers 116, 108 and 106, all simultaneously. The fire in the fire pot will consequently be hightened and the temperature of the car will be raised to the proper temperature. If such temperature is exceeded, actuation of the thermostat in the other direction will result, and through a reversal of movement of the connecting rods, the damper members will be correspondingly closed.

Because of the particular arrangement of the thermostat, the connecting rods, the dampers, and also because of the adjusting mechanism for the thermostat, it is possible with the heater described to maintain the temperature of a produce railroad car, for example, at substantially any one of a series of predetermined temperatures.

Aside from the general difficulty of controlling the heat emanating from any charcoal heater within relatively narrow limits (because you cannot kill the fire completely), there existed a great problem. This problem, as touched upon above, consisted of supplying a control mechanism which was not only sensitive within limits but which was so designed that mere movement of a thermostatic element (not having any great force) would be sufficient to open and close both lower and upper damper members to corresponding degrees, and simultaneously. After many unsuccessful efforts, the arrangement described above was created. It is delicately balanced so that movement of the bellows, or other thermostatic element, will actuate the dampers 116, 108 and 106 through the especially designed connecting system.

One of the important features of the invention resides in the positioning and location of the thermostat. It will be noted that it is disposed beneath the fire pot proper from which it is amply insulated by the mica insulation in the base of the fire pot cylinder and also by the ¾ inch layer of "Marinite." Also as previously mentioned, this positioning permits only air from the car to reach the thermostat whereby the heater is more accurate in maintaining the proper temperature.

Moreover, the thermostat unit is well protected from damage as it is disposed entirely within the circumference of the heater. The same is true of the connecting rods and the dampers. In fact, there is nothing which protrudes from the heater which might result in damaging the heater or its operation if accidentally struck.

The heater is built to contain enough charcoal for a comparatively long trip, and the control arrangement is such that the heater requires no manual adjustment or servicing once it has been started.

Moreover, if the heater ever needs servicing, as undoubtedly it will, after considerable use, it can be easily taken down for repairs. The construction is such that worn parts can be readily replaced with the minimum of time and skill.

The arrangement which has been described and illustrated has now been found to avoid the disadvantages of the old charcoal freight car heaters. It makes it possible with a charcoal heater to control the temperature of a freight car within definite limits suitable for the transportation of various types of fruits and vegetables and other commodities of a perishable nature. The delicately balanced mechanism shown and described is also sufficiently sturdy to resist the inevitable shocks, jolts and jars to which it would be subjected in freight car travel.

We claim:

1. In the combination of a solid fuel heater, damper means, and thermostatic control means; that improvement which comprises said heater having a cylindrical base, an upright concentric combustion chamber disposed above the base and having a diameter less than said base, an annular member sealing the space between the outer wall of the base and the bottom edge of said combustion chamber, a draft opening in said annular member, a top member for said combustion chamber having a pair of oppositely disposed draft openings therein, said damper means comprising a pivoted damper member adapted to open and close said first-named draft opening, pivoted draft members for said pair of draft openings, a link connecting said last-named damper members to effect simultaneous and equal movement of both upon movement of one, a rod secured to said first-mentioned damper member and extending upwardly, the upper end of said rod being secured to said connecting link, a member secured at one end to said thermostat and movable thereby, a pivoted member, a rod connecting said first-mentioned damper member to said pivoted member, said thermostatically moved member being secured to said pivoted member.

2. In an arrangement according to claim 1, said thermostat being mounted beneath the combustion chamber and insulated therefrom.

3. In an arrangement according to claim 1, said damper members being pivoted to turn about their longitudinal centers, said dampers for said pair of openings each having an element offset from its longitudinal center, said connecting link for said dampers being pivotally secured near its ends to said offset elements.

GROVER C. HOCH.
FRANK CAMPBELL.
FRANK MEYERS.